United States Patent [19]

Motoyama et al.

[11] Patent Number: 4,499,738

[45] Date of Patent: Feb. 19, 1985

[54] CONTROL DEVICE FOR A REFRIGERATOR

[75] Inventors: Takeshi Motoyama; Toshiyuki Onishi; Kunio Yokoyama, all of Oosaka, Japan

[73] Assignee: Tokyo Shibaura Denki Kabushiki Kaisha, Kawasaki, Japan

[21] Appl. No.: 508,236

[22] Filed: Jun. 27, 1983

[30] Foreign Application Priority Data

Jun. 30, 1982 [JP] Japan .............. 57-99044[U]
Jun. 30, 1982 [JP] Japan .............. 57-99045[U]

[51] Int. Cl.³ ............... F25D 21/06; G05D 23/19; F25B 41/00
[52] U.S. Cl. .................... 62/155; 62/157; 62/163; 62/198; 62/231
[58] Field of Search ........... 62/155, 157, 158, 231, 62/234, 283, 197, 198, 199, 200, 161, 162, 163, 164, 524, 525, 526

[56] References Cited

U.S. PATENT DOCUMENTS 2,133,949 10/1938 Buchanan .................. 62/199
4,206,612 6/1980 Gardner ................... 62/234 X
4,270,364 6/1981 Oonishi et al. .............. 62/198
4,389,854 6/1983 Ogita et al. ............... 62/198

FOREIGN PATENT DOCUMENTS 55-72774 5/1980 Japan .

Primary Examiner—Harry Tanner
Attorney, Agent, or Firm—Cushman, Darby & Cushman

[57] ABSTRACT

A refrigerator having a control device is provided with a refrigerating cycle system constructed by connecting in series a compressor, a condenser, capillary tubes, a storage compartment evaporator and a freezing compartment evaporator. This control device comprises a first control circuit to forcefully cool the freezing compartment evaporator upon receipt of a first instruction signal, a second control circuit for removing the frost deposited on the freezing compartment evaporator upon receipt of a second instruction signal, and a preferential control circuit, which, in case an operation based on a preferentially issued instruction signal is taking place, and, during this interim, a delayed instruction is given, causes an operation based on the delayed instruction signal to be commenced only after the operation based on the preferential instruction signal is brought to an end.

4 Claims, 5 Drawing Figures

CONTROL DEVICE FOR A REFRIGERATOR

BACKGROUND OF THE INVENTION

This invention relates to a control device for a refrigerator which is provided with an evaporator for a storage compartment and an evaporator for a freezing compartment, and more particularly to a refrigerator control device including a forced defrosting control circuit for the freezing compartment evaporator and a forced cooling control circuit for the freezing compartment evaporator.

The known direct cooling refrigerator, comprising a storage compartment evaporator and a freezing compartment evaporator connected in series, is generally provided with forced cooling means for forcibly cooling the freezing compartment evaporator only for a prescribed length of time to freeze the food in the freezing compartment rapidly and forced defrosting means for periodically removing frost deposited in concentrations on the frost depositing portion of the freezing compartment by actuating a heater.

The known refrigerator is so designed that when an instruction signal is given to rapidly cool the freezing compartment during the prescribed defrosting period, then the defrosting operation ceases to allow the rapid cooling of the freezing compartment. In such a case, the frost settled on the frost depositing portion of the freezing compartment is allowed to remain there until the next periodical defrosting operation is conducted without being completely removed. It is known that frost settles in concentrations on the upper and rear plates of the freezing compartment partly constituting the freezing compartment evaporator. When, therefore, the frosting state is sustained until the following prescribed defrosting time, the frost accumulated on the above-mentioned upper and rear plates sometimes grows into large ice chunks. During the regular defrosting period large ice chunks attached to, for example, the upper plate of the freezing compartment often drop, alarming the user. It is preferred that the defrosting operation be fully carried out in accordance with a schedule.

SUMMARY OF THE INVENTION

It is accordingly the object of this invention to provide a refrigerator control device which, after a control operation is brought to an end which is undertaken upon receipt of an instruction to forcefully cool the freezing compartment evaporator or an instruction signal to forcefully remove the frost deposited on a frost depositing portion within the freezing compartment, whichever is given preference, allows for the commencement of a control operation related to the delayed instruction signal.

This invention is a control device for a refrigerator provided with a closed refrigerating cycle system constructed by connecting in series a compressor, condenser, capillary tube means, evaporator for a storage compartment, and evaporator for a freezing compartment in the order mentioned. The control device comprises forced freezing means including by-pass means which by-passes a coolant passage for the storage compartment evaporator for cooling only the freezing compartment evaporator; forced defrosting means which is set near a frost depositing portion in the freezing compartment on which frost is concentratedly deposited and removes the frost settled on the frost depositing portion; first control means which drives the forced freezing means, when supplied with a first instruction signal; second control means which drives the forced defrosting means, when supplied with a second instruction signal; and preferential control means, which, in case a control operation is taking place upon receipt of the first or second instruction signal, whichever is given earlier, and during this interim a delayed instruction signal is issued, actuates the first or second control means in such a manner that a control operation based on the delayed instruction signal is commenced only after a control operation based on the earlier instruction signal is brought to an end.

DETAILED DESCRIPTION OF THE PREFERRED EMBODIMENTS

Figure 1:
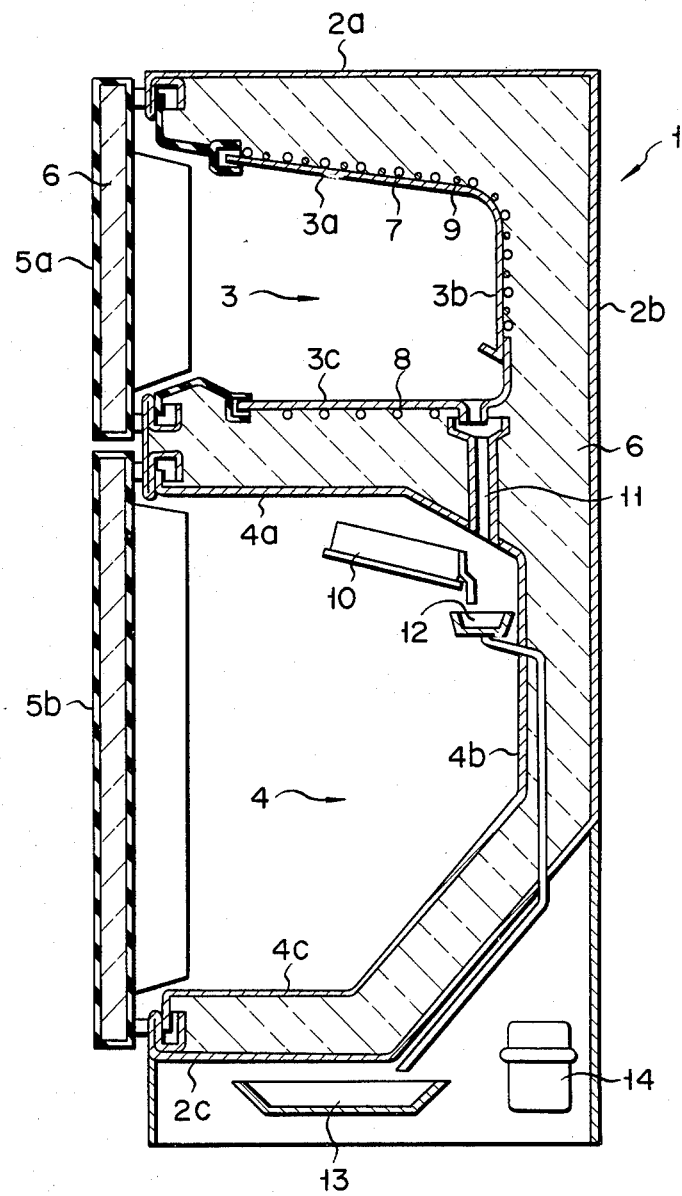
FIG. 1 is a cross sectional view of a refrigerator controlled by a control device embodying this invention.

Referring to FIG. 1, the main cabinet of a refrigerator 1 involves an upper plate 2a, back plate 2b, bottom plate 2c and side plates (not shown). Provided in the upper region of the interior of the main cabinet is a freezing compartment defined by an upper wall 3a, rear wall 3b integrally formed therewith, bottom wall 3c and side walls (not shown). Provided in the lower region of the interior of the main cabinet is a storage compartment 4 defined by an upper wall 4a, rear wall 4b, bottom wall 4c and side walls (not shown). The open part of the freezing compartment 3 is fitted with a door 5a, and the open part of the storage compartment 4 is fitted with a door 5b. A heat-insulating material 6 is fitted in the doors 5a and 5b; in a region defined by the bottom wall 3c of the freezing compartment 3 and the upper wall of the storage compartment 4; in a region defined by the upper and rear walls 3a and 3b and side walls of the freezing compartment 3; and in a region defined by the rear wall 4b and bottom wall 4c and side walls of the storage compartment 4. A first freezing compartment evaporator 7 for cooling the freezing compartment 3 is set close to the outside of the upper wall 3a and rear wall 3b of the freezing compartment 3 to effect heat release. A heater 9 for removing frost deposited on the inside planes of the upper wall 3a and rear wall 3b is provided close to the outside of the walls 3a and 3b. A second evaporator 8 for cooling the freezing compartment 3 is set close to the outside of the bottom wall 3c of the freezing compartment 3. The aforesaid upper wall 3a and rear wall 3b jointly constitute part of the first freezing compartment evaporator 7. The bottom wall 3c is used as part of the second freezing compartment evaporator 8. Further, a drainage pipe 11, drainage receiver 12 and drainage pan 13 are provided in the positions indicated in FIG. 1. A compressor 14 is provided below the main cabinet. The first freezing compartment evaporator 7 is cooled to a lower temperature than the second freezing compartment evaporator 8 to cause frost to concentrate on the upper wall 3a and rear wall 3b of the freezing compartment 3.

Figure 2:
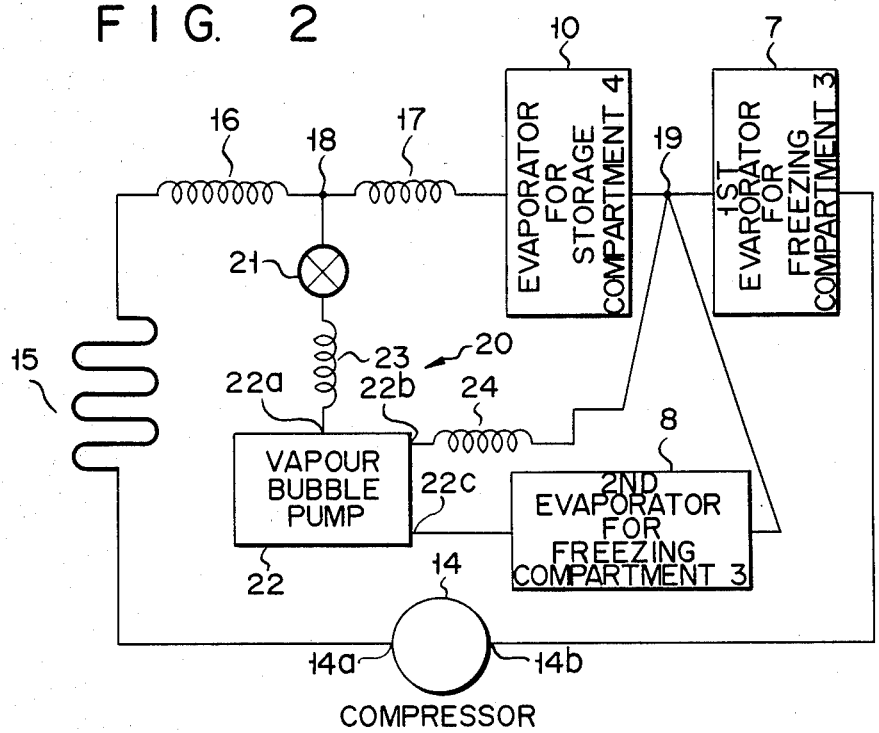
FIG. 2 is a block circuit diagram showing one embodiment of the combination of the refrigerating cycle system and by-pass device for the storage compartment evaporator shown in FIG. 1.

Referring to FIG. 2, a coolant passage constituting a refrigerating cycle system is defined by a coolant outlet 14a of the compressor 14, condenser 15, first capillary tube 16, second capillary tube 17, storage compartment evaporator 10, first freezing compartment evaporator 7 and coolant inlet 14b of the compressor 14 arranged in the order mentioned. A coolant by-pass 20 is provided between the junction 18 of the capillary tubes 16 and 17 and the junction 19 of the evaporators 7 and 10. The coolant by-pass 20 involves: an electromagnetic valve 21 whose inlet is connected to the junction 18 of the capillary tubes 16 and 17; a vapour bubble pump (a coolant pass switching device) 22 provided with, for example, a coolant inlet 20a, first coolant outlet 22b and second coolant outlet 22c; a third capillary tube 23 connected between the outlet of the electromagnetic valve 21 and the inlet 22a of the vapour bubble pump 22; a fourth capillary tube 24 connected between the first coolant outlet 22b and the junction 19 of the evaporators 7 and 10; and the second freezing compartment evaporator 8 connected between the second coolant outlet 22c and the junction 19 of the evaporators 7 and 10. When a heater 22d (FIG. 3) built in the vapour bubble pump 22 is deenergized, the vapour bubble pump 22 causes a coolant to be conducted from the inlet 22a to the fourth capillary tube 24. When the built-in heater 22d is energized, vapour bubble pump 22 causes the coolant to be carried from the inlet 22a to the second freezing compartment evaporator 8.

Figure 3:
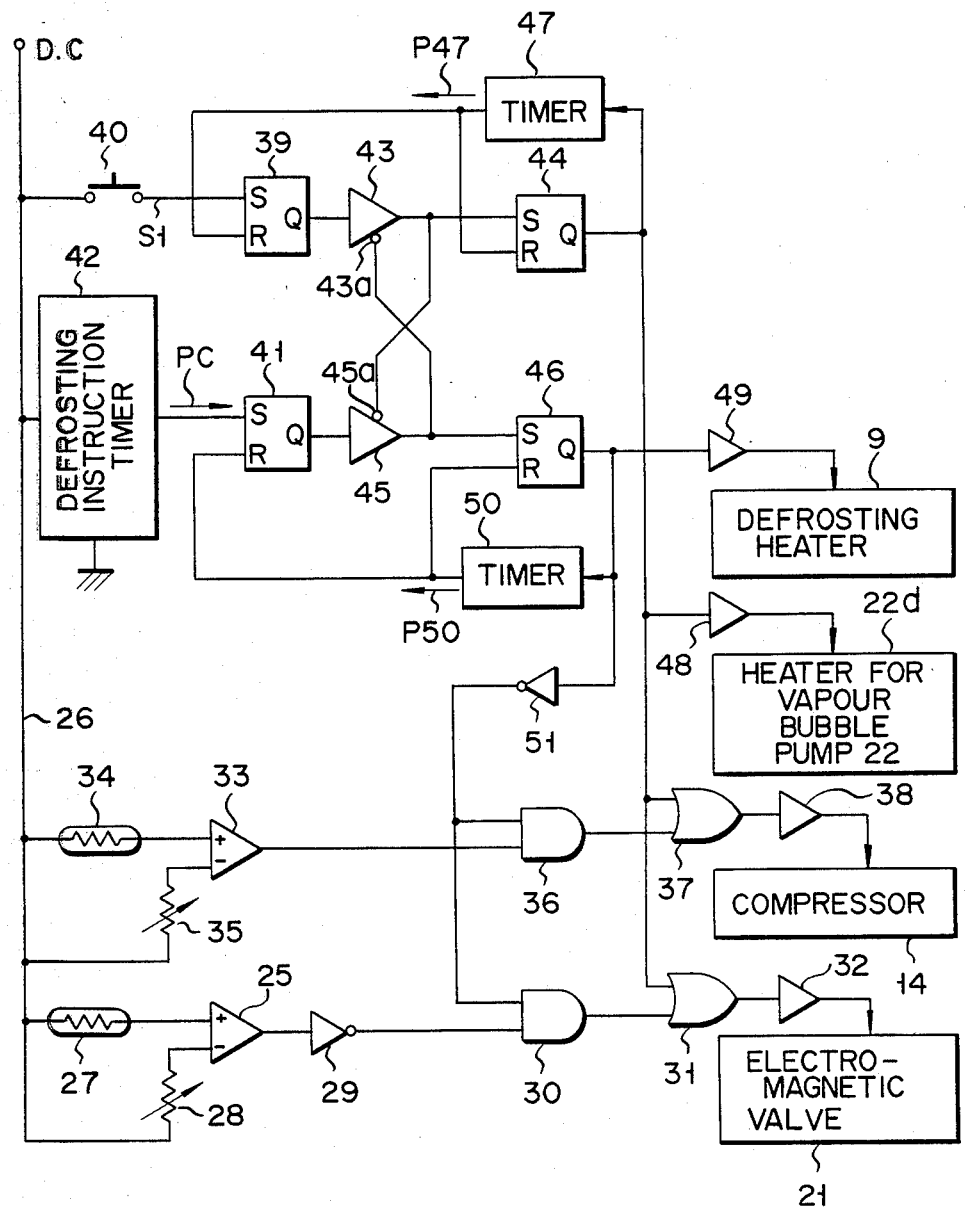
FIG. 3 is a block circuit diagram of a control device for a refrigerator according to a first embodiment of the invention.

Referring to FIG. 3 which only indicates those portions of the refrigerator control device which are related to the control circuit embodying this invention, a thermistor 27 is connected between the positive input terminal (+) of a first comparator 25 and D.C. control line 26 to detect the temperature of the storage compartment evaporator 10. A variable resistor 28 is connected between the negative terminal (−) of the first comparator 25 and D.C. control line 26 to adjust the prescribed temperature level TR at which the temperature of the storage compartment is to be set. When the temperature of the storage compartment evaporator 10 rises above the prescribed temperature level TR, the first comparator 25 issues a signal having a high level "H". When the temperature of the storage compartment evaporator 10 falls below the prescribed temperature level TR, the first comparator 25 produces a signal having a low level "L". An output signal from the first comparator 25 is delivered to a drive circuit 32 through an inverter 29, one input terminal respectively of AND circuit 30 and OR circuit 31. The electromagnetic valve 21 is opened only when the input terminal of the drive circuit 32 is supplied with a signal having a high level "H". A thermistor 34 is connected between the positive input terminal (+) of a second comparator 33 and control line 26 to detect the temperature of the first freezing compartment evaporator 7. A variable resistor 35 is connected between the negative terminal (−) of the second comparator 33 and control line 26 to adjust the prescribed temperature level TF of the freezing compartment. When the temperature of the evaporator 7 rises above the prescribed temperature level TF, the second comparator 33 issues a signal having a high level "H". When the temperature of the evaporator 7 falls below the prescribed level TF, the second comparator 33 emits a signal having a low level "L". An output signal from the second comparator 33 is delivered to a drive circuit 38 through one input terminal respectively of an AND circuit 36 and OR circuit 37. The aforementioned compressor 14 is actuated only when the drive circuit 38 is supplied with a signal having a high level "H".

An instant freezing start switch 40 of an automatic return type is connected between the set terminal S of a first flip-flop circuit 39 and the control line 26. The first flip-flop circuit 39 is set by an instant freezing instruction signal S1 issued at the depression of the switch 40, causing a high level signal to be emitted from the output terminal Q of the flip-flop circuit 39. A defrosting instruction timer 42 is connected between a second flip-flop circuit 41 and control line 26 to issue a defrosting instruction signal PC. The timer 42 sends forth one timer pulse PC (defrosting instruction signal) for each period of 24 hours. The timer pulse PC sets the second flip-flop circuit 41, causing a high level signal to be delivered from the set output terminal Q thereof. An output signal from the set output terminal Q of the first flip-flop circuit 39 is supplied to the set terminal S of a third flip-flop circuit 44 through a transfer gate 43. An output signal from the set output terminal Q of the second flip-flop circuit 41 is sent forth to the set terminal S of a fourth flip-flop circuit 46 through a transfer gate 45. The transfer gate 43 is rendered conductive only when a gate terminal 43a connected to the output terminal of the transfer gate 45 is set at a low level "L". The transfer gate 45 is rendered conductive only when a gate terminal 45a connected to the output terminal of the transfer gate 43 is set at a low level "L". The set output terminal Q of the third flip-flop circuit 44 is connected to the input terminals of the timer 47 and drive circuit 48 and the other input terminals of the OR circuits 31 and 37. The output terminal of the timer 47 is connected to the reset terminals R of the first and third flip-flop circuits 39 and 44. The set output terminal Q of the fourth flip-flop circuit 46 is connected to the input terminals of a drive circuit 49 and timer 50 and also to the other input terminals of the AND circuits 30 and 36 through an inverter 51. The output terminal of the timer 50 is connected to the reset terminals R of the second and fourth flip-flop circuits 41 and 46. For example, 40 minutes after receiving a high level signal at the input terminal, the timer 47 issues a high level pulse P47 to stop the instant freezing action. For example, 30 minutes after receiving a high level signal at the input terminal, the timer 50 sends forth a high level pulse P50 to stop the defrosting action. The defrosting heater 9 is energized only when the driving circuit 49 is supplied with a high level signal. The heater 22d of the vapour bubble pump 22 is energized only when the drive circuit 48 receives a high level signal.

Description will now be given of the operation of the control device of FIG. 3. When the instant freezing start switch 40 is not depressed and no defrosting action takes place, a cooling action is performed in conformity with the ordinary refrigerating cycle. Now let it be assumed that the temperature of the storage compartment evaporator 10, that is, the temperature detected by the thermistor 27 is higher than the prescribed temperature level TR and the first comparator 25 issues a high level signal; the temperature of the first freezing compartment evaporator 7, that is, the temperature detected by the thermistor 34 is higher than the prescribed temperature level TF and the second comparator 33 also sends forth a high level signal. Then, one input terminal of the AND circuit 36 is supplied with a high level signal. In contrast, one input terminal of the AND circuit 30 is supplied with a low level signal obtained by inverting the high level output signal from the comparator 25 through the inverter 29. Since no defrosting action takes place, the set output terminal Q of the fourth flip-flop circuit 46 issues a low level signal. This low level signal is inverted by the inverter 51, causing the other input terminals of the AND circuits 30 and 36 to be supplied with a high level signal. Therefore, a low level signal is delivered from the AND circuit 30, and a high level signal is sent forth from the AND circuit 36. Since, at this time, an instant freezing action does not take place, the set output terminal Q of the third flip-flop circuit 44 issues a low level signal. One input terminal of the OR circuit 31 is supplied with a low level signal, and the other input terminal thereof is also supplied with a low level signal. Accordingly, the drive circuit 32 is supplied with a low level signal. At this time, therefore, the electromagnetic valve 21 remains closed. However, one input terminal of the OR circuit 37 is supplied with a high level signal, causing the drive circuit 38 also to receive a high level signal, and the compressor 14 to be driven. Thus a coolant from the outlet 14a of the compressor 14 is supplied to the storage compartment evaporator 10 and freezing compartment evaporator 7 to cool the corresponding compartments.

Now let it be assumed that the temperature of the storage compartment 4 falls by the aforementioned cooling operation, and the thermistor 27 has detected the temperature of the storage compartment 4 which has fallen below the prescribed temperature level TR. Then, the first comparator 25 issues a low level signal. One input terminal of the AND circuit 30 is supplied with a high level signal through the inverter 29, and the other input terminal of the AND circit 30 also receives a high level signal, causing the driving circuit 32 to be supplied with a high level signal. Since at this time, the electromagnetic valve 21 is opened, and the instant freezing operation is not started by means of the switch 40, the heater 22d built into the vapour bubble pump 22 remains deenergized. Therefore, the outlet of the third capillary tube 23 and the inlet of the fourth capillary tube 24 are allowed to communicate with each other. The coolant is supplied to the evaporator 7 alone to cool the freezing compartment 3. When the thermistor 34 detects that the temperature of the freezing compartment 3 has fallen below the prescribed temperature level TF, the second comparator 33 sends forth a low level signal. Since, at this time, the compressor 14 stops, the operation of the refrigerating cycle system is brought to an end. Later when the thermistor 34 detects that the temperature of the freezing compartment 3 has risen above the prescribed temperature level TF, the operation of the compressor 14 is resumed. Thus, the ordinary cooling operation is carried out in which the electromagnetic valve 21 is closed or opened in accordance with the level of the temperature of the freezing compartment 3 detected by the thermistor 27.

In addition to the above-mentioned ordinary cooling operation, it is often demanded to quickly freeze water (home freezing operation). In such a case, a container of a material to be frozen (water) is mounted particularly on the second freezing compartment evaporator 8. The instant freezing start switch 40 is depressed for a short length of time. At this time, the first flip-flop circuit 39 is set, and a high level signal is delivered from the set output terminal Q thereof to the input terminal of the transfer gate 43. It is supposed that in such a case, the defrosting operation does not take place in the freezing compartment 3. Since the terminal 43a of the transfer gate 43 is supplied with a low level signal, the transfer gate 43 remains conductive, causing the third flip-flop circuit 44 to be set. A high level signal is supplied from the third flip-flop circuit 44 to the drive circuits 32, 38 and 48. Therefore, the compressor 14 is actuated regardless of the level of out signals from the first and second comparators 25 and 33, causing the electromagnetic valve 21 to be opened, and further the heater 22d of the vapour bubble pump 22 to be energized. As a result, a coolant flows through the outlet 14a of the compressor 14, condenser 15, first capillary tube 16, electromagnetic valve 21, third capillary tube 23, vapour bubble pump 22, evaporator 8 of the freezing compartment 3, evaporator 7 of the freezing compartment and coolant inlet 14b of the compressor 14 in turn. Thus, the forced cooling of the freezing compartment 3 is strated. The timer 47 now supplied with a high level signal from the third flip-flop circuit 44 commences a timer operation. For example, 40 minutes later, a timer pulse $P_{47}$ is issued to reset the flip-flop circuits 39 and 44. As a result, the operation of the compressor 14 is brought to an end; the electromagnetic valve 21 is closed; and the heater 22d is deenergized, causing the forced freezing operation to be stopped.

Description will now be given of a defrosting operation taking place in the freezing compartment 3. While the aforesaid forced cooling operation is not undertaken, the first freezing compartment evaporator 7 alone is cooled, and the second freezing compartment evaporator 8 is not cooled. Therefore, frost is concentratedly deposited on the outer walls of the first evaporator 7. While the aforesaid forced freezing is taking place, frost also settles on the outer wall of the second freezing compartment evaporator 8. Since, however, the first evaporator 7 is so designed as to be cooled to a lower temperature than the second evaporator 8, the frost attached to the outer wall of the second evaporator 8 are conducted to the first evaporator 7 due to a sublimation action. Actually, therefore, frost settles on the first evaporator 7 alone. Now let it be assumed that no forced freezing operation is taking place, and the defrosting instruction timer 42 issues a timer pulse PC. Then, the second flip-flop circuit 41 is set, and a high level signal from the set output terminal Q of the flip-flop circuit 41 is supplied to the input terminal of the transfer gate 45. Since the forced cooling is not carried out, the terminal 45a of the transfer gate 45 is supplied with a low level signal, causing the transfer gate 45 to be rendered conductive, and consequently the fourth flip-flop circuit 46 to be set. A high level signal from the set output terminal Q of the fourth flip-flop circuit 46 is delivered to the drive circuit 49. At this time, the defrosting heater 9 is energized to commence a defrosting operation. The high level signal from the fourth flip-flop circuit 46 is also supplied to the other input terminals of the AND circuits 30 and 36 through the inverter 51. Accordingly, the electromagnetic valve 21 is closed; the operation of the compressor 14 is brought to an end; and the defrosting operation effectively proceeds. When receiving a high level signal from the fourth flip-flop circuit 46, the timer 50 commences a timer operation; sending forth a pulse $P_{50}$ after, for example, 30 minutes. This pulse $P_{50}$ resets the second and fourth flip-flop circuits 41 and 46, terminating the forced defrosting operation. Later, the compressor 14 and electromagnetic valve 21 are controlled in accordance with the level of output signals from the comparators 33 and 25. With the foregoing embodiment, the forced defrosting operation is automatically carried out with a periodic cycle.

Description will now be given of a case in which the second flip-flop circuit 41 is supplied with a defrosting instruction signal PC (an output pulse from the timer 42), the defrosting operation is going on, and during this interim an instant freezing instruction signal S1 is delivered to the first flip-flop circuit 39. In this case, a high level signal from the transfer gate 45 is supplied to the terminal 43a of the transfer gate 43. Therefore, even when an instant freezing instruction signal S1 is sent to the set terminal of the first flip-flop circuit 39 to reset it, and the input terminal of the transfer gate 43 is supplied with a high level signal, a high level signal is not issued from the transfer gate 43, thereby preventing the instant freezing operation from commencing. When, however, the defrosting operation is brought to an end, the second flip-flop circuit 41 is reset by the timer pulse $P_{50}$, causing the transfer gate 43 to emit a high level signal. This high level signal sets the third flip-flop circuit 44, thereby causing the instant freezing operation to commence.

Description will now be given of the operation of the subject control device for a refrigerator when an instant freezing operation continues due to a forced cooling instruction signal S1 being supplied to the first flip-flop circuit 39, and the instant freezing operation is carried out, and during this interim a forced defrosting instruction signal PC is delivered to the second flip-flop circuit 41. During the instant freezing operation, a high level signal is sent from the transfer gate 43, causing the transfer gate 45 to remain conductive. Even when a forced defrosting instruction signal PC is supplied to the second flip-flop circuit 41 at this time, the defrosting operation does not take place, because the transfer gate 45 remains nonconductive. When, however, the forced instant freezing operation is brought to an end, and the first flip-flop circuit 39 is reset, then the fourth flip-flop circuit 46 is set, causing the forced defrosting operation to commence.

When, with the embodiment of FIG. 3, a defrosting instruction signal PC is supplied to the second flip-flop circuit 41 even while no forced freezing operation is going on, a defrosting operation immediately commences. When a defrosting instruction signal is sent to the second flip-flop circuit 41 while a forced instant freezing operation is going on, a defrosting operation is commenced at once when the forced instant freezing operation is completed, thereby completely effecting the defrosting operation. Further, the defrosting operation does not interrupt the instant freezing operation, which, therefore, can be carried out within a prescribed period of time.

The functions of the transfer gates 43, 45, flip-flop circuits 39, 41, 44, 46 and timers 47, 50 can be included in a microcomputer program.

Figure 4:
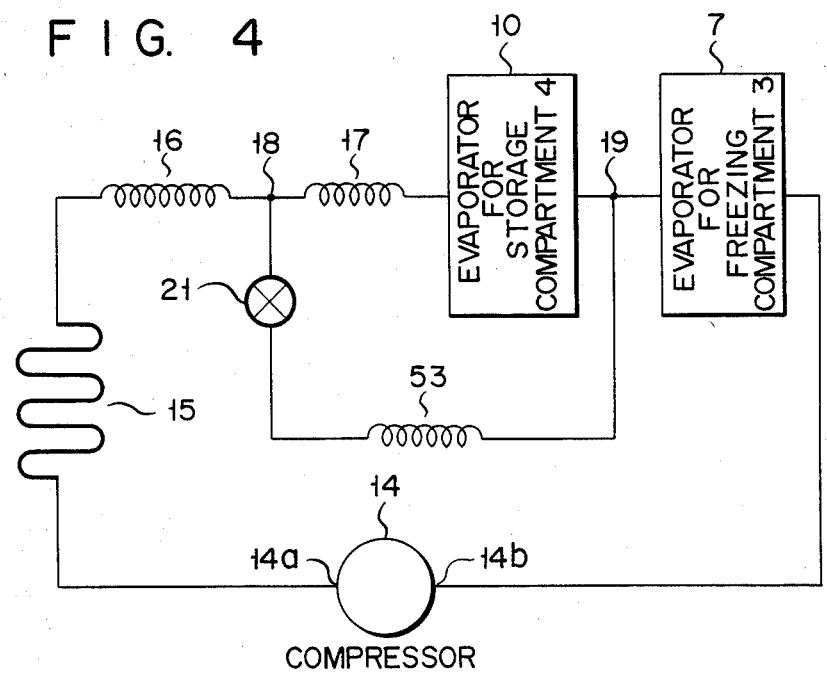
FIG. 4 is a block circuit diagram showing another embodiment of the combination of the refrigerating cycle system and by-pass device for the storage compartment evaporator shown in FIG. 1.

The by-pass for coolant passage defined by the second capillary tube 17 and storage compartment evaporator 10 need not be limited to the route 20 shown in FIG. 2. But this invention is applicable to a refrigerator which, as illustrated in FIG. 4, is provided with a by-pass route including an electromagnetic valve 21 and third capillary tube 53. In the refrigerator of FIG. 4, the second freezing compartment evaporator 8 is omitted. When, in the case of FIG. 4, the control device is supplied with a forced instant freezing instruction signal S1, it is advised to open the electromagnetic valve 21, conduct a coolant to the first freezing compartment evaporator 7 alone. When the control device is supplied with a forced defrosting instruction signal PC, it is advised to energize the defrosting heater 9. If, while a control operation is taking place which is based on a preferential instruction, another delayed instruction is issued, it is obviously advisable to start a control operation based on the delayed instruction, after a control operation based on the preferential instruction is brought to an end. A control device adapted to attain the above-mentioned object can be realized by modifying the circuit arrangement of FIG. 3.

Figure 5:
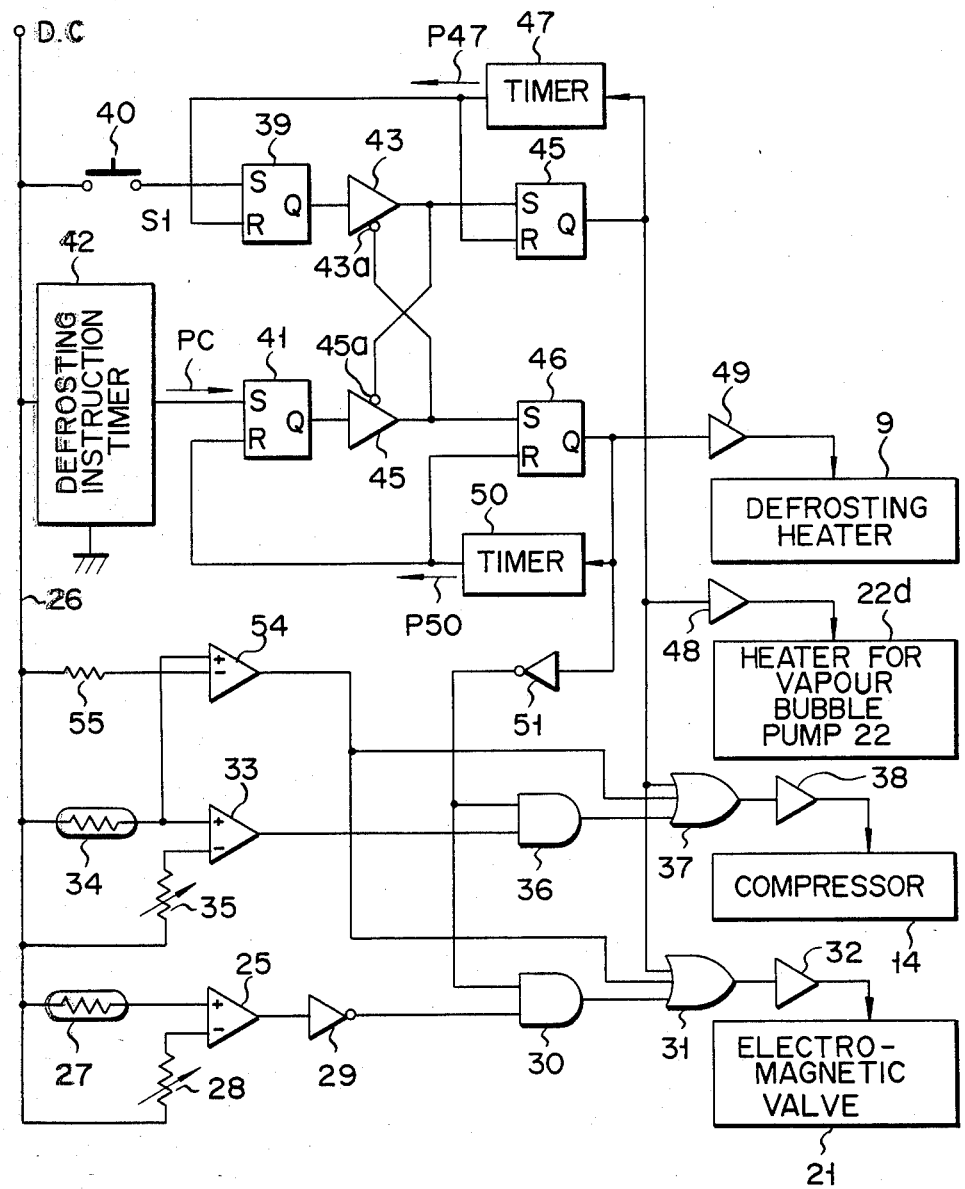
FIG. 5 is a block circuit diagram of a control device for a refrigerator according to a second embodiment of the invention.

Description will now be given with reference to FIG. 5 which is a second embodiment of this invention. When the doors 5a and 5b of the freezing compartment 3 and storage compartment 4 are often opened and closed, or a large amount of foodstuffs are additionally received in the freezing and storage compartments, then the temperatures of these compartments 3 and 4 rise above the prescribed temperature level. In such a case, a coolant is supplied to both freezing compartment evaporator 7 and storage compartment evaporator 10. If, in such case, a coolant is vaporized at a higher temperature than prescribed in the storage compartment 10, then the freezing compartment evaporator 7 is unsatisfactorily cooled, resulting in a rise in the temperature of an interior of the freezing compartment 3. Since, for example, ice cream or other frozen foodstuffs calling for a long storage are held in the freezing compartment 3, it is necessary to always set the temperature of the interior of the freezing compartment 3 at a prescribed level. When the temperature rises above $-8°$ C., ice cream, for example, becomes soft, resulting in the isolation of fatty components. To date, however, no refrigerator has been proposed which detects the temperature of the interior of the freezing compartment and assures the prescribed upper limit temperature of the freezing compartment by utilizing the detected temperature. Referring to a control device of FIG. 5, a third comparator 54 is further provided. A thermistor 34 is connected between the positive terminal (+) of the third comparator 54 and control line 26. Further, a resistor 55 is connected between the negative terminal (−) of the third comparator 54 and control line 26 to impress reference voltage on the negative terminal (−). When the temperature of the interior of the freezing compartment 3 rises higher than a prescribed temperature level, for example, $-8°$ C., then the third comparator 54 produces a high level signal. This output signal from the third comparator 54 is supplied to the third input terminals of OR circuits 31 and 37. When the thermistor 34 detects that the temperature of the interior of the freezing compartment 3 has fallen below, for example, $-13°$ C., then the comparator 54 issues a low level signal.

While the ordinary cooling operation is carried on, the temperature detected by the thermistor 34 does not go higher than the guaranteed temperature of $-8°$ C., preventing the comparator 54 from generating a high level signal. When, however, the doors 5a and 5b are frequently opened and closed, and a large amount of foodstuffs are received in the freezing compartment 3 and storage compartment 4, then the cooling efficiency of the freezing compartment evaporator 7 falls, sometimes causing the thermistor 34 to detect a higher temperature than the guaranteed level of $-8°$ C. At this time, the third comparator 54 issues a high level signal, causing, the compressor 14 to be operated regardless of the levels of output signals from the first and second comparator 25 and 33, and the electromagnetic valve 21 to be opened. The load of the freezing compartment 3 is normally so designed as to account for one third of the total load of the freezing compartment 3 and storage compartment 4. Even when, therefore, the load of the freezing compartment 3 extremely increases, the temperature of the freezing compartment 3 can be lowered by supplying a coolant to the freezing compartment evaporator 7 alone. When the thermistor 34 detects that the temperature of the interior of the freezing compartment 3 has fallen below $-13°$ C., the comparator 54 issues a low level signal, causing the electromagnetic valve 21 and compressor 14 to be controlled only according to the level of output signals from the comparators 25 and 33.

What is claimed is:

1. A control device for a refrigerator provided with a closed refrigerating cycle system including, in series in the following order, a compressor, a condenser, capillary tubes, an evaporator for a storage compartment, and an evaporator for a freezing compartment, comprising:

forced cooling means, including by-pass means for by-passing a coolant passage for said storage compartment evaporator, for cooling only said freezing compartment evaporator, said by-pass means comprising an electromagnetic valve having an inlet connected to a node between first and second capillary tubes and a third capillary tube whose outlet is connected to a node between said storage compartment evaporator and said freezing compartment evaporator;

forced defrosting means, positioned near a frost deposition portion in said freezing compartment on which frost is concentratedly deposited, for removing frost settled on said frost depositing position;

first control means for driving said forced cooling means in response to a first instruction signal supplied thereto and which comprises a first flip-flop circuit which is set upon receipt of said first instruction signal, a third flip-flop circuit which is set upon receipt of an output signal from said first flip-flop circuit, a timer which is actuated by an output signal from said third flip-flop circuit and produces a timer pulse after a prescribed length of time, causing said first and third flip-flop circuits to be reset, and circuit means for, upon receipt of the output signal from said third flip-flop circuit, opening said electromagnetic valve and actuating said compressor;

second control means for driving said forced defrosting means when supplied with a second instruction signal and which comprises a second flip-flop circuit which is set upon receipt of said second instruction signal, a fourth flip-flop circuit which is set upon receipt of an output signal from said second flip-flop circuit, a timer which is actuated upon receipt of an output signal from said fourth flip-flop circuit, and issues a timer pulse after a prescribed length of time, causing said second and fourth flip-flop circuits to be reset, and circuit means for, upon receipt of the output signal from said fourth flip-flop circuit, energizing a heater for said forced defrosting means and preventing said compressor from being operated; and preferential control means, comprising a first transfer gate connected between the output of said first flip-flop circuit and the set input of said third flip-flop circuit, and a second transfer gate connected between the output of said second flip-flop circuit and the set input of said fourth flip-flop circuit, said first transfer gate being rendered conductive only when a gate terminal of said first transfer gate receives a low level signal from an output terminal of said second transfer gate, said second transfer gate being rendered conductive only when a gate terminal of said second transfer gate receives a low level signal from the output terminal of said first transfer gate, for controlling defrosting and forced cooling.

2. A control device for a refrigerator provided with a closed refrigerating cycle system including, in series in the following order, a compressor, a condenser, capillary tubes, an evaporator for a storage compartment, and an evaporator for a freezing compartment, comprising:

forced cooling means, including by-pass means for by-passing a coolant passage of said storage compartment evaporator, for cooling only said freezing compartment evaporator, said by-pass means including an electromagnetic valve having an inlet connected to a node between first and second capillary tubes, a vapor bubble pump which includes a drive heater and the inlet thereof being connected to a first output thereof when said drive heater remains deenergized and is connected to a second outlet thereof when said dirve heater is energized, a third capillary tube whose inlet is connected to an outlet of said electromagnetic valve, and whose outlet is connected to the inlet of said vapor bubble pump, a fourth capillary tube whose inlet is connected to the first outlet of said vapor bubble pump, and whose outlet is connected to a node between said storage compartment evaporator and said first freezing compartment evaporator, and a second freezing evaporator whose inlet is connected to the second outlet of said vapor bubble pump and whose outlet is connected to said node between said storage compartment evaporator and said first freezing compartment evaporator;

forced defrosting means, positioned near a frost deposition portion in said freezing compartment on which frost is concentratedly deposited, for removing the frost settled on said frost depositing position;

first control means which comprises a first flip-flop circuit which is set upon receipt of a first instruction signal, a third flip-flop circuit which is set upon receipt of an output signal from said first flip-flop circuit, a timer which is actuated by an output signal from said third flip-flop circuit and produces a timer pulse after a prescribed length of time, causing said first and third flip-flop circuits to be reset thereby, and circuit means which, upon receipt of the output signal from said third flip-flop circuit, opens said electromagnetic valve, drives said compressor, and energizes said drive heater for said vapor bubble pump;

second control means which comprises a second flip-flop circuit which is set upon receipt of a second instruction signal, a fourth flip-flop circuit which is set upon receipt of an output signal from said second flip-flop circuit, a timer which is actuated upon receipt of the output signal from said fourth flip-flop circuit, and produces a timer pulse after a prescribed length of time, causing said second and fourth flip-flop circuit to be reset, and circuit means for, upon receipt of the set output signal from said fourth flip-flop circuit, stopping the operation of said compressor and energizing a heater for said forced defrosting means; and preferential control means which comprises a first transfer gate connected between the set output terminal of said first flip-flop circuit and the set terminal of said third flip-flop circuit, and a second transfer gate connected between the set output terminal of said second flip-flop circuit and the set terminal of said fourth flip-flop circuit, said first transfer gate being rendered conductive only when the gate terminal of said first transfer gate receives a low level signal from the output terminal of said second transfer gate, and said second transfer gate being rendered conductive only when the gate terminal of said second transfer gate receives a low level signal from the output terminal of said first transfer gate for controlling defrosting and forced cooling.

3. A control device for a refrigerator provided with a closed refrigerating cycle system including, in series in the following order, a compressor, a condenser, capillary tubes, an evaporator for a storage compartment, and an evaporator for a freezing compartment, comprising:

forced cooling means, including by-pass means which by-passes a coolant passage of said storage compartment evaporator for cooling only said freezing compartment evaporator, said by-pass means including an electromagnetic valve whose inlet is connected to a node between a first and second capillary tubes, a vapor bubble pump which includes a drive heater and the inlet thereof being connected to the first outlet thereof when said drive heater remains deenergized, and is connected to a second outlet thereof when said drive heater is energized, a third capillary tube whose inlet is connected to the outlet of said electromagnetic valve, and whose outlet is connected to the inlet of said vapor bubble pump, a fourth capillary tube whose inlet is connected to the first outlet of said vapor bubble pump, and whose outlet is connected to a node between said storage compartment evaporator and said first freezing compartment evaporator, and a second freezing evaporator whose inlet is connected to the second outlet of said vapor bubble pump and whose outlet is connected to said node between said storage compartment evaporator and said first freezing compartment evaporator;

forced defrosting means, which is positioned near a frost depositing portion in said freezing compartment on which frost is concentratedly deposited, for removing frost settled on said frost depositing position;

first control means for driving said forced cooling means, when supplied with a first instruction signal;

second control means for driving said forced defrosting means, when supplied with a second instruction signal; and preferential control means for effecting a control operation upon receipt of said first or second instruction signal, whichever is provided earlier, and which, when during this interim a delayed instruction signal is issued actuates said first or second control means in such a manner that a control operation based on said delayed instruction signal commences only after a control operation based on an earlier instruction signal is brought to an end.

4. A control device according to claim 1, wherein said second instruction signal is periodically issued from a timer connected to a D.C. control line.

* * * * *